(12) United States Patent
Kalinowski

(10) Patent No.: US 8,172,320 B2
(45) Date of Patent: May 8, 2012

(54) IMPACT ABSORPTION BLOCK FOR VEHICLE SEATBACK ASSEMBLY

(75) Inventor: David Kalinowski, Ferndale, MI (US)

(73) Assignee: Nissan North America, Inc., Franklin, TN (US)

( * ) Notice: Subject to any disclaimer, the term of this patent is extended or adjusted under 35 U.S.C. 154(b) by 121 days.

(21) Appl. No.: 12/703,816

(22) Filed: Feb. 11, 2010

(65) Prior Publication Data

US 2011/0193378 A1   Aug. 11, 2011

(51) Int. Cl.
*B60N 2/42* (2006.01)
(52) U.S. Cl. ............ 297/216.13; 297/216.1; 297/216.14
(58) Field of Classification Search ............... 297/216.1, 297/216.13, 216.14, 216.15, 216.16
See application file for complete search history.

(56) References Cited

U.S. PATENT DOCUMENTS

| | | | |
|---|---|---|---|
| 3,612,607 A | 10/1971 | Lohr | |
| 5,248,185 A | 9/1993 | Weingartner et al. | |
| 5,253,924 A * | 10/1993 | Glance | 297/216.13 X |
| 5,400,490 A | 3/1995 | Burchi | |
| 5,509,716 A * | 4/1996 | Kolena et al. | 297/216.13 |
| 5,544,942 A | 8/1996 | Vu Khac et al. | |
| 5,645,316 A * | 7/1997 | Aufrere et al. | 297/216.13 |
| 5,651,582 A * | 7/1997 | Nakano | 297/216.13 |
| 6,062,642 A * | 5/2000 | Sinnhuber et al. | 297/216.13 |
| 6,217,062 B1 * | 4/2001 | Breyvogel et al. | 297/216.13 X |
| 6,447,058 B1 * | 9/2002 | Jackson | 297/216.13 |
| 6,520,577 B2 * | 2/2003 | Kitagawa | 297/216.13 |
| 6,523,893 B2 * | 2/2003 | Kamper et al. | 297/216.13 |
| 6,688,686 B1 | 2/2004 | McEvoy et al. | |
| 6,702,387 B2 * | 3/2004 | Munemura et al. | 297/216.13 X |
| 6,769,737 B2 * | 8/2004 | Choi | 297/216.14 |
| 6,779,841 B2 * | 8/2004 | Eckendorff | 297/216.13 |
| 6,857,698 B2 * | 2/2005 | Saberan et al. | 297/216.13 |
| 6,896,324 B1 * | 5/2005 | Kull et al. | 297/216.1 |
| 6,921,132 B2 * | 7/2005 | Fujita et al. | 297/216.13 |
| 6,926,358 B2 * | 8/2005 | Fujita et al. | 297/216.14 |
| 7,083,230 B2 * | 8/2006 | Kull et al. | 297/216.1 |
| 7,090,293 B2 * | 8/2006 | Saberan et al. | 297/216.13 |
| 7,156,457 B2 * | 1/2007 | Fujita et al. | 297/216.1 |
| 7,185,950 B2 * | 3/2007 | Pettersson et al. | 297/216.13 X |
| 7,281,766 B2 * | 10/2007 | Fujita et al. | 297/378.12 |
| 7,284,800 B2 * | 10/2007 | Ishizuka | 297/216.13 X |
| 7,303,229 B2 * | 12/2007 | Fujita et al. | 297/216.14 |
| 7,416,256 B2 * | 8/2008 | Fujita et al. | 297/216.1 X |
| 7,484,798 B2 * | 2/2009 | Yamaguchi | 297/216.13 X |
| 7,527,334 B2 * | 5/2009 | Kiehler et al. | 297/216.13 |
| 7,641,280 B2 * | 1/2010 | Uno et al. | 297/216.14 X |
| 7,963,599 B2 * | 6/2011 | Omori et al. | 297/216.13 X |
| 7,967,380 B2 * | 6/2011 | Omori et al. | 297/216.13 X |
| 7,971,932 B2 * | 7/2011 | Niitsuma et al. | 297/216.14 |
| 7,984,945 B2 * | 7/2011 | Sayama | 297/216.13 X |
| 8,033,602 B2 * | 10/2011 | Yamaki et al. | 297/216.13 |
| 2006/0138817 A1 * | 6/2006 | Gorman et al. | 297/216.15 |

(Continued)

*Primary Examiner* — Rodney B White
(74) *Attorney, Agent, or Firm* — Young Basile Hanlon & MacFarlane, P.C.

(57) ABSTRACT

Disclosed herein are embodiments of impact absorption blocks and vehicle seatbacks and seats comprising impact absorption blocks. One embodiment of a vehicle seatback assembly comprises a seatback frame, a seat pad and an impact absorption block. The seatback frame comprises a first side member having an upper end and a lower end, a second side member spaced apart from and substantially parallel to the first side member and having an upper end and a lower end and a cross-member extending between the first and second side members. The seat pad overlies the seatback frame to define a forward surface. The impact absorption block is positioned between the seat pad and the cross member.

20 Claims, 7 Drawing Sheets

U.S. PATENT DOCUMENTS

| | | |
|---|---|---|
| 2008/0315635 A1* | 12/2008 | Kimura et al. ............. 297/216.1 |
| 2009/0021061 A1* | 1/2009 | Yamaki et al. ........... 297/216.13 |
| 2010/0148546 A1* | 6/2010 | Demontis et al. ........ 297/216.13 |
| 2010/0176630 A1* | 7/2010 | Nitsuma .................. 297/216.13 |
| 2010/0181812 A1* | 7/2010 | Nitsuma .................. 297/216.13 |
| 2010/0187876 A1* | 7/2010 | Nitsuma .................. 297/216.13 |
| 2011/0148157 A1* | 6/2011 | Braun-Fischer ......... 297/216.13 |

* cited by examiner

IMPACT ABSORPTION BLOCK FOR VEHICLE SEATBACK ASSEMBLY

BACKGROUND

Vehicle seats serve many purposes such as acting as a comfortable riding surface for occupants as well as acting as a rigid structure on which occupants are restrained when a vehicle experiences sudden changes in acceleration. Therefore, seat frames are designed sufficiently sturdy such that they are capable of withstanding significant forces realized during acceleration, braking and impact with other objects. Since seat frames are designed to remain rigidly in place at all times, designers must take into account the ways in which occupants interact with seat frame components under all potential operating conditions. An example of such a design consideration is an anti-submarining frame component or seat contour, which acts to prevent an occupant from being capable of sliding forward and under a lap belt during a forward collision. Vehicle designers also seek to minimize the impact of forces on bodily joints such as the neck during rear impact collisions.

BRIEF SUMMARY

Embodiments of impact absorption blocks, vehicle seatbacks and seats comprising impact absorption blocks are disclosed herein. One embodiment of a vehicle seatback assembly comprises a seatback frame, a seat pad and an impact absorption block. The seatback frame comprises a first side member having an upper end and a lower end, a second side member spaced apart from and substantially parallel to the first side member and having an upper end and a lower end and a cross-member extending between the first and second side members. The seat pad overlies the seatback frame to define a forward surface. The impact absorption block is positioned between the seat pad and the cross member.

One embodiment of an impact absorption block is for use in a vehicle seatback assembly that includes a frame with a cross-member and a seat pad supported by the frame. The impact absorption block comprises a front surface positioned spaced apart from a seat occupant by the seat pad, wherein a vertical midpoint of the front surface is positioned to align with a hip point, the hip point being defined by a hip joint location of the seat occupant, and a rear surface positioned to align vertically with the cross-member of the frame.

DETAILED DESCRIPTION

Collisions that apply forces to a rear end of a vehicle ultimately create forces on an occupant's body. For example, in a rear impact collision, an occupant's head can both rotate rearward and thrust forward with as much as 30° of deflection with respect to the torso. U.S. motor vehicle code FMVSS 202A became effective for front seats in 2006 and was designed to restrain head movement in order to minimize forces on the necks of occupants. The federal code restricts head-to-chest rotation to 12°. The code applies to rear seats for all new vehicles as of Sep. 1, 2010.

Efforts to reduce neck movement in vehicle occupants resulting from rear impact collisions have typically been made by focusing on the design of head rests. For example, in some designs such a WHIPS (Whiplash Protection System) by Volvo the seatback moves together with the occupant while the head restraint remains rigid. See *Volvo Seat Is Benchmark For Whiplash Protection*, Volvo Owners Club, Aug. 22, 2006. Other designs such as SAHR by Saab utilize active head restraint systems. However, further improvements in occupant head restraint are desired.

A rear impact collision may force an occupant's pelvis rearward toward the seatback while the vehicle and seatback are forced forward. As seatbacks are typically made from seat padding placed over a seat frame, the rearward movement of the pelvis may not be blocked until it collides with a portion of the seat frame such as a cross-member through the padding. This rearward movement of the pelvis in turn moves the chest, increasing head-to-chest rotation. As most head restraint efforts focus on head rests, these designs do little in the way of addressing pelvic movement.

Vehicle seatback assemblies disclosed herein are designed to include a block projection in a lower-rear area of a seat back, which is typically a hollow interior cavity. Locating the block projection in this location can improve interactions of occupants with seat frames during abnormal impact. The block projection can comprise an energy-absorbing material that is more rigid than the rest of the seat pad. The block does not require existing seatback components to be brought closer to occupants. The assemblies also do not require significant accommodating design changes.

Figure 1:
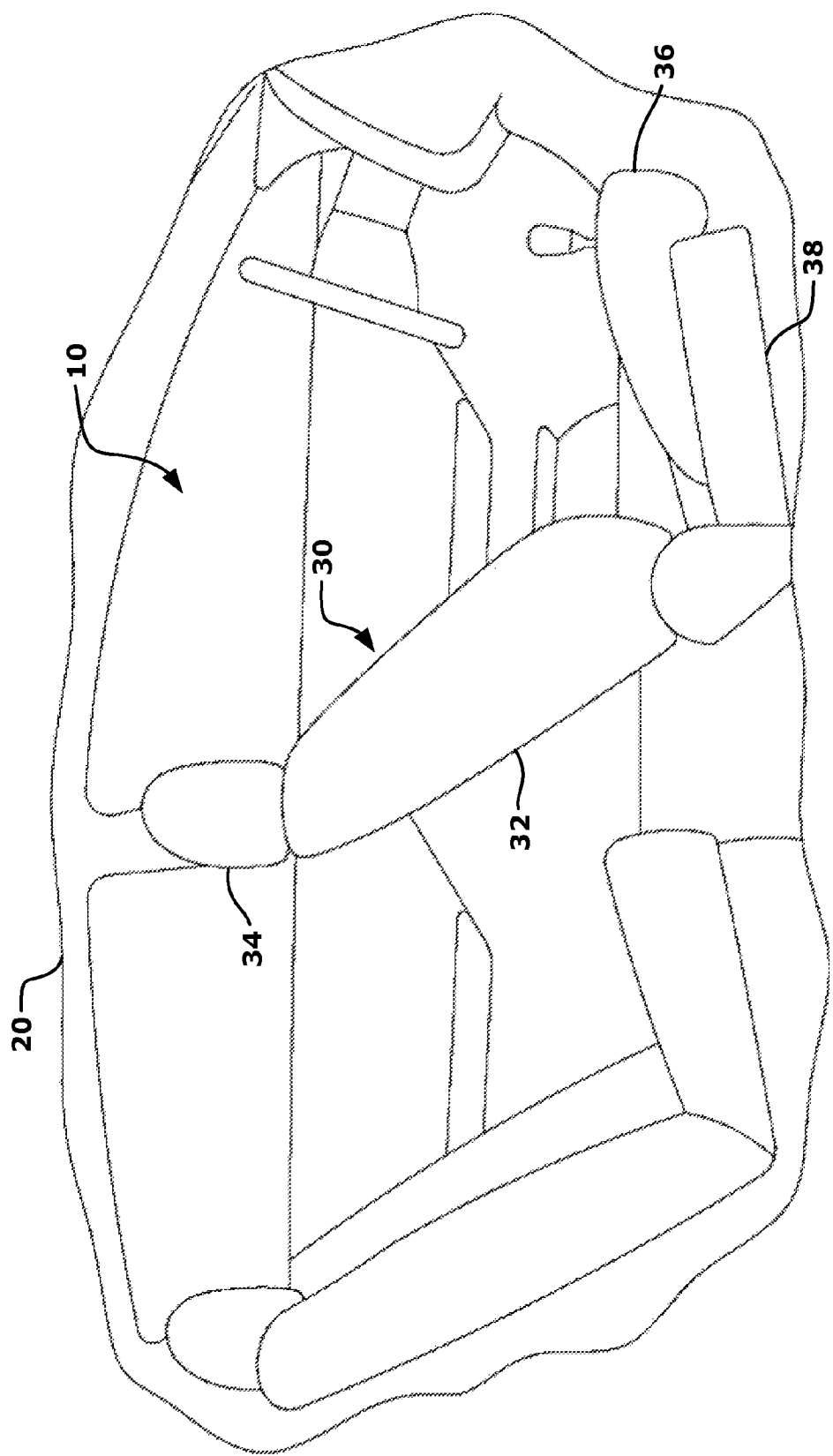
FIG. 1 is a side view of the interior of a passenger compartment.

FIG. 1 is a side view of a passenger compartment 10 of a motor vehicle 20 having both front seats and back seats. However, the embodiments described herein are not limited to this type of motor vehicle and can be incorporated into sedans, trucks, sports utility vehicles, vans, and buses as non-limiting examples. In addition, the motor vehicle is not limited to the front and back seats as illustrated and can have any number of seats and rows of seats.

Figure 2:
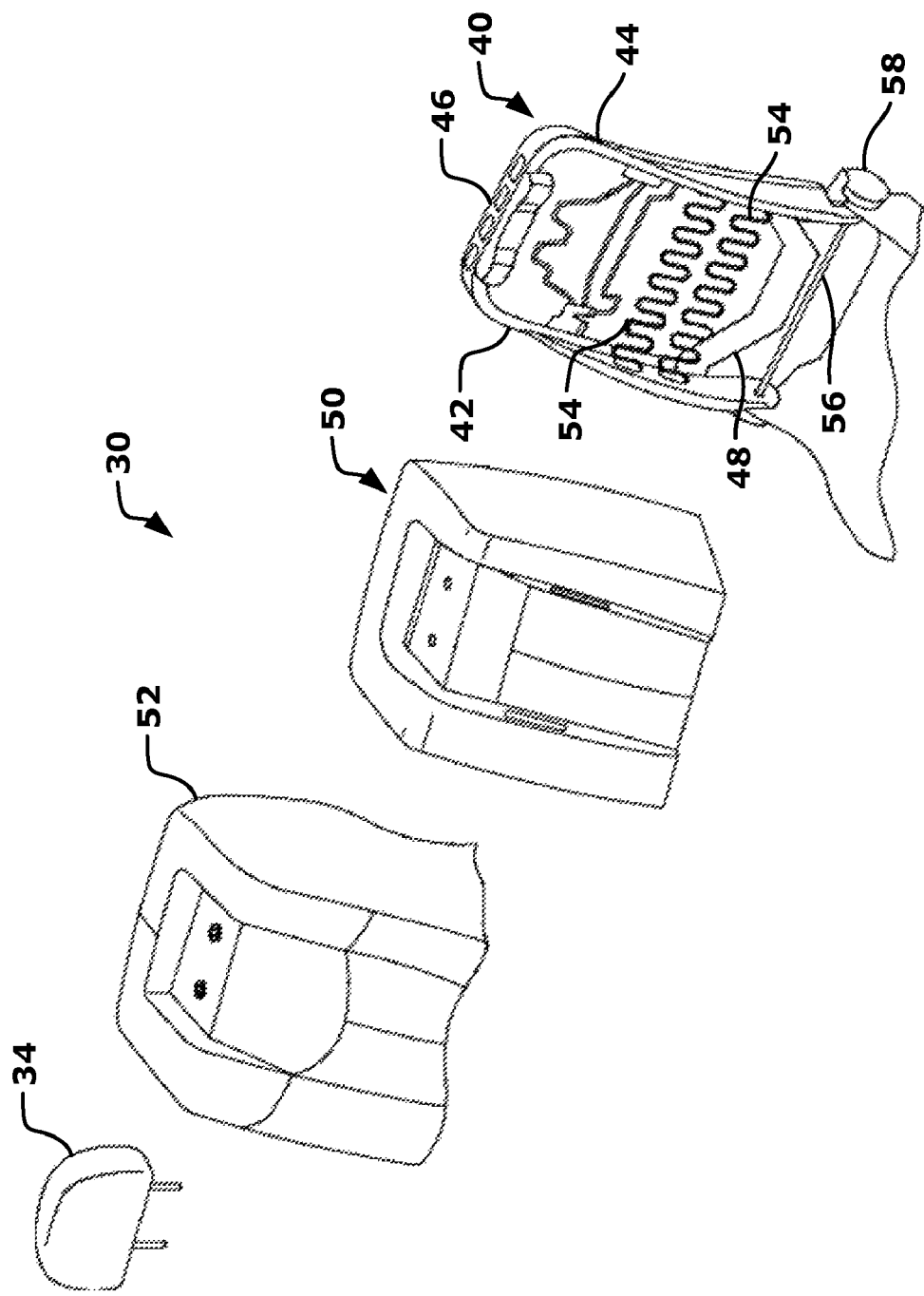
FIG. 2 is an exploded view of a vehicle seatback.

A typical vehicle seat 30, as shown in FIG. 2, has a seatback 32 supporting a headrest 34 and a seat cushion 36 resting on a seat frame 38. A seatback frame 40 includes side members 42, 44, a top member 46 and at least one cross-member 48. The seat cushion 36 and the seatback 32 in each case include padding 50 which is covered by a trim cover 52 such as upholstery. The trim cover 52 is typically divided into a plurality of subsections by stitching. The typical vehicle seat 30 can also include spring supports 54, a torque rod 56, and one or more recline assemblies 58. The vehicle seat 30 illustrated in the figures is provided by means of example and is not limited to the particular shape shown or the particular components shown.

Figure 3:
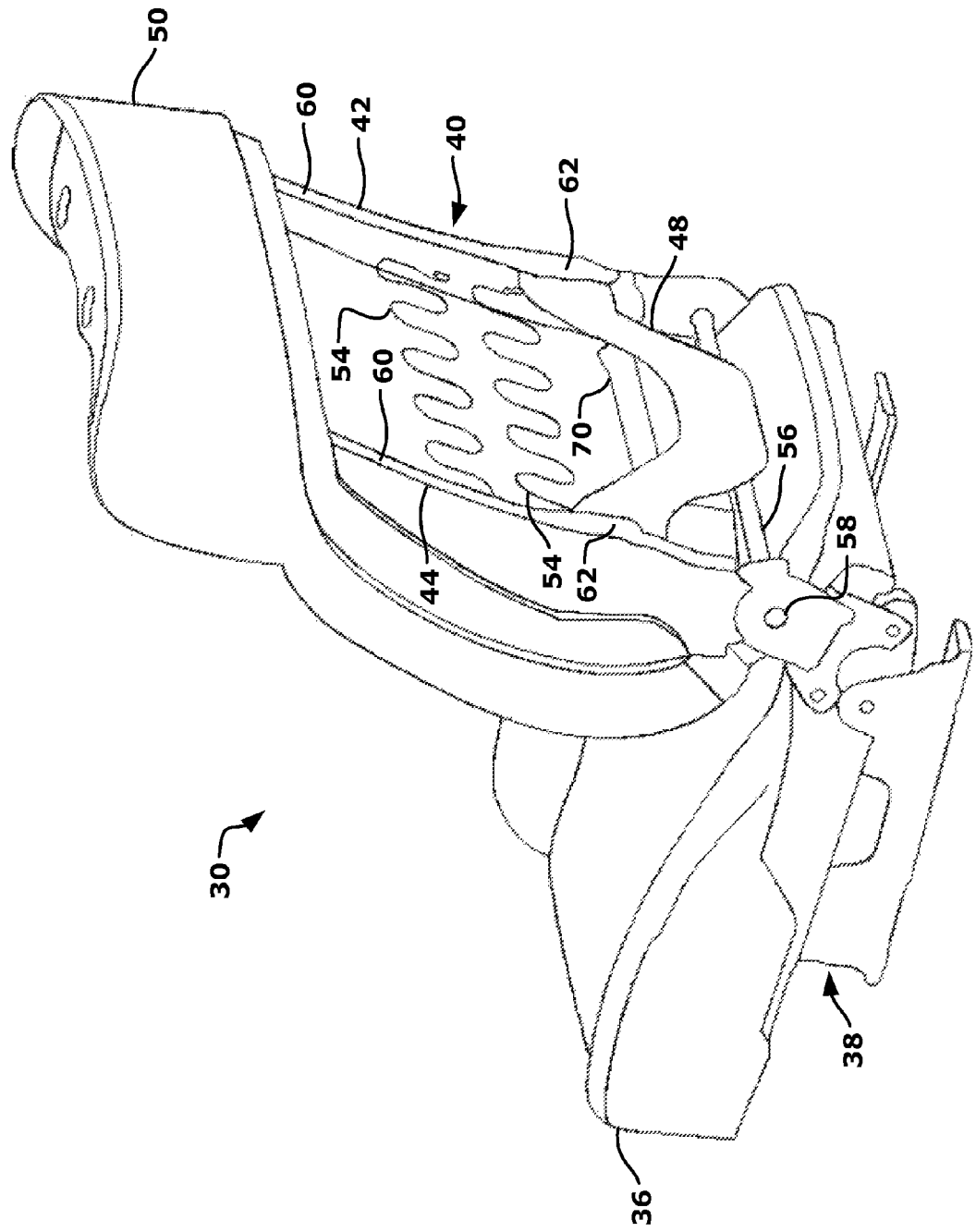
FIG. 3 is a rear perspective view of a seat pad installed to a seat frame.

One embodiment disclosed herein of a vehicle seatback assembly is shown in FIG. 3. FIG. 3 is a rear perspective view of the seatback assembly with the rear seat covering cut away. The vehicle seatback assembly comprises a seatback frame 40 having a first side member 42 with an upper end 60 and a lower end 62 and a second side member 44. The second side member 44 is spaced apart from and is substantially parallel to the first side member 42 and also has an upper end 60 and a lower end 62. At least one cross-member 48 extends between the first and second side members 42, 44. The seat pad 50 overlies the seatback frame 40. An impact absorption block 70 is positioned between the seat pad 50 and the cross-member 48.

Figure 4:
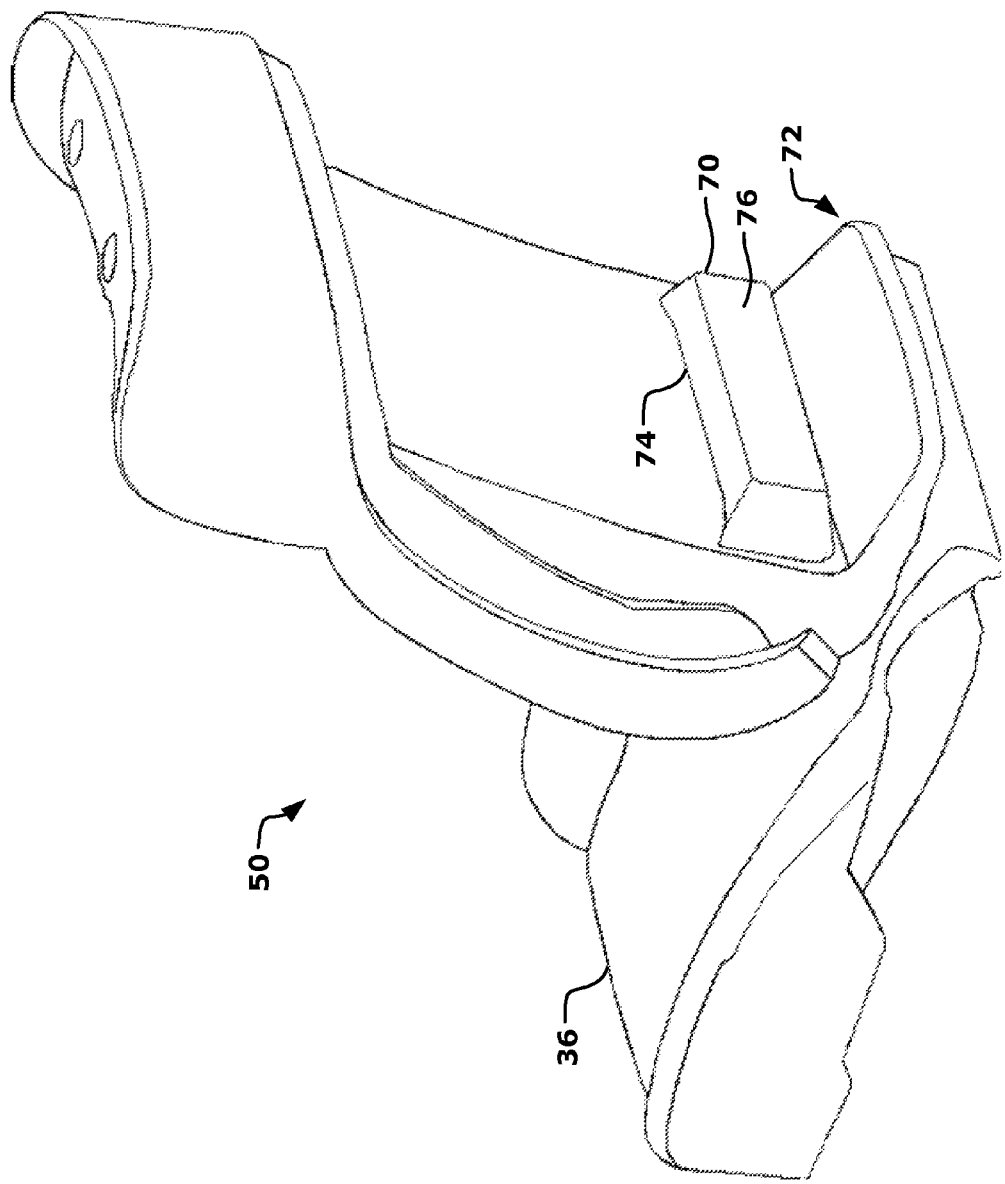
FIG. 4 is a rear perspective view of the seat pad.

FIG. 4 is a rear perspective view of a seat pad 50 with the impact absorption block 70. The impact absorption block 70 is attached to the seat pad 50 on an internal surface proximate the bottom of the seat back. The impact absorption block 70 can be fixedly attached to the seat pad 50. For example, the impact absorption block 70 can be over-molded onto the seat pad 50 or fixedly attached by other means including fasteners and adhesives. The impact absorption block 70 can also be removably attached to the seat pad 50, as long as the attachment is strong enough to maintain the block 70 in its position during use. The seat pad 50 can be a foam pad or any other material known by those skilled in the art. The impact absorption block 70 can be a material that is denser than the material used for the seat pad 50. For example, the impact absorption block 70 can be made of polyurethane foam that is denser than the material of the seat pad 50.

The impact absorption block 70 can be spaced apart from a bottom portion 72 of the seat pad 50, as shown in FIG. 4. The impact absorption block 70 can have a first surface 74 that is positioned toward the seat pad 50 and a second surface 76 opposite the first surface 74 that has a smaller area than the first surface 74. The shape of the impact absorption block 70 is provided by way of example and is not meant to be limiting. Other shapes can be used that still maintain the utility of the invention.

Figure 5:
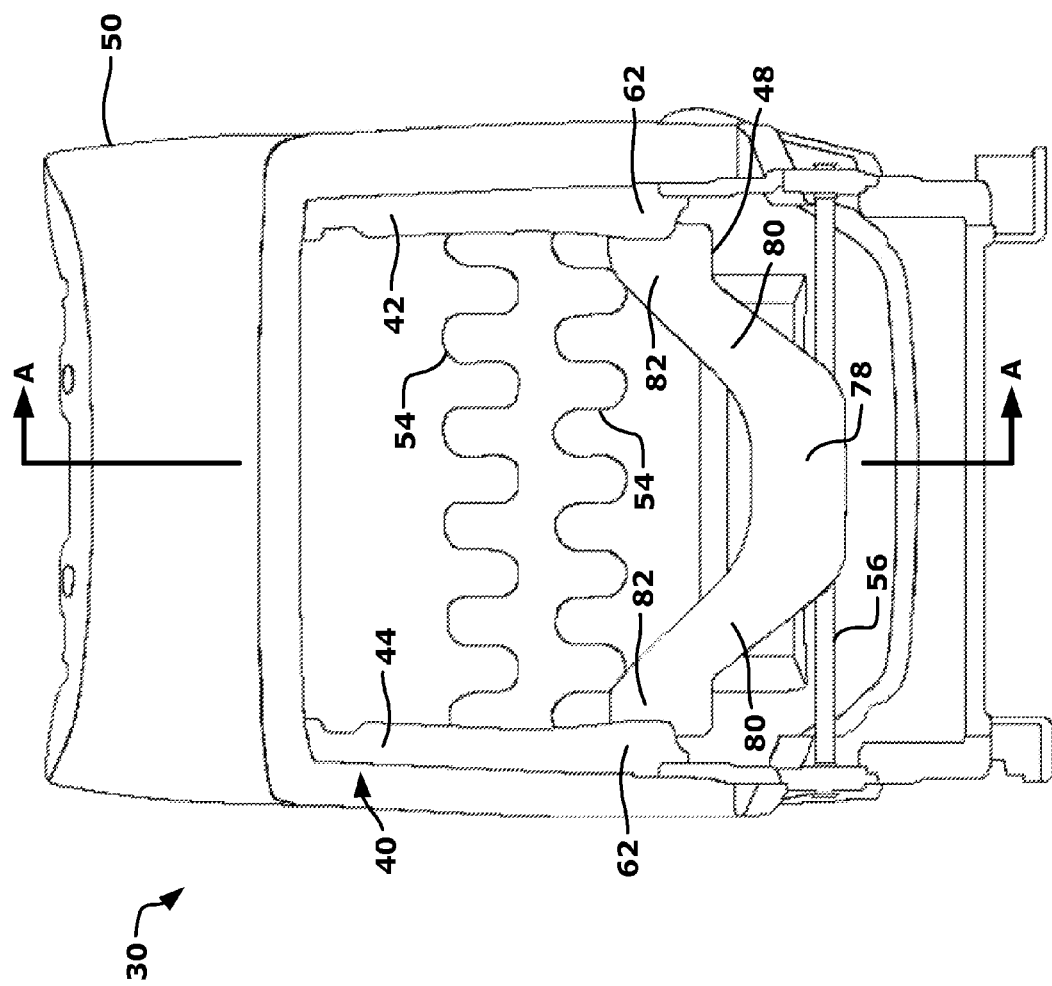
FIG. 5 is a rear view of the seat back assembly.

FIG. 5 is a rear view of an embodiment of the seat back 30 assembly. The cross-member 48 can connect to the lower ends 62 of the first and second side members 42, 44. The cross-member 48 can extend between the first and second side members 42, 44 in a generally V-shaped construction. The cross-member 48 can comprise a base segment 78 having two ends, a side segment 80 extending at an angle from each end and a flange 82 extending from each side segment 80 opposite the base segment 78. The impact absorption block 70 is positioned between the seat pad 50 and the cross-member 48 and can substantially span a lateral width between the first and second side members 42, 44. As shown, the torque rod 56 can connect to the first and second side members 42, 44 and extend laterally between the first and second side members 42, 44. The impact absorption block 70 is positioned above the torque rod 56.

Figure 6:
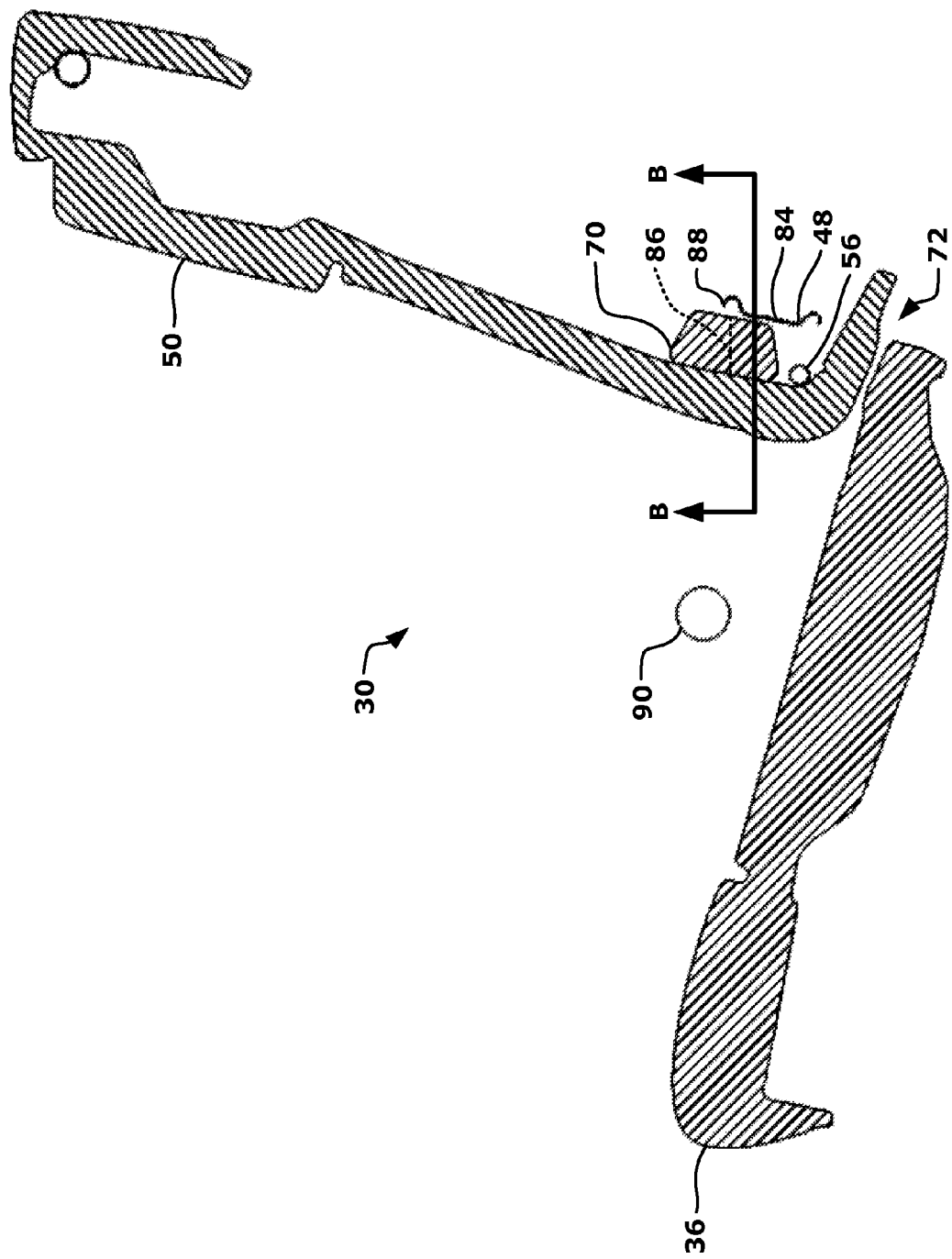
FIG. 6 is a sectional side view of FIG. 5 along line A-A.

FIG. 6 is a sectional side view of FIG. 5 along line A-A. As shown, the seat pad 50 can include the bottom portion 72 that extends rearward from a bottom end of the seat pad 50 and below the torque rod 56. The bottom portion 72 can extend beyond a rear surface 84 of the cross-member 48. The seat back 30 has a pivot axis around which the seatback rotates, the pivot axis being in the general location of the torque rod 56. The impact absorption block 70 is positioned above this pivot axis. As illustrated in FIG. 6, the impact absorption block 70 can be positioned such that a vertical midpoint 86 of the impact absorption block 70 is generally aligned vertically with a top edge 88 of the base segment 78 of the cross-member 48.

A hip point 90 of the vehicle seatback assembly is defined by a hip joint location of a seat occupant. The hip joint is the joint between the femur and the pelvis. The impact absorption block 70 can be positioned such that the vertical midpoint 86 of the impact absorption block 70 is generally aligned in the seatback 30 with the hip point 90. The hip point 90 is based on the size of an average adult occupant. However, the vertical height of the impact absorption block 70 is designed to provide impact absorption for a range of adult sizes.

Figure 7:
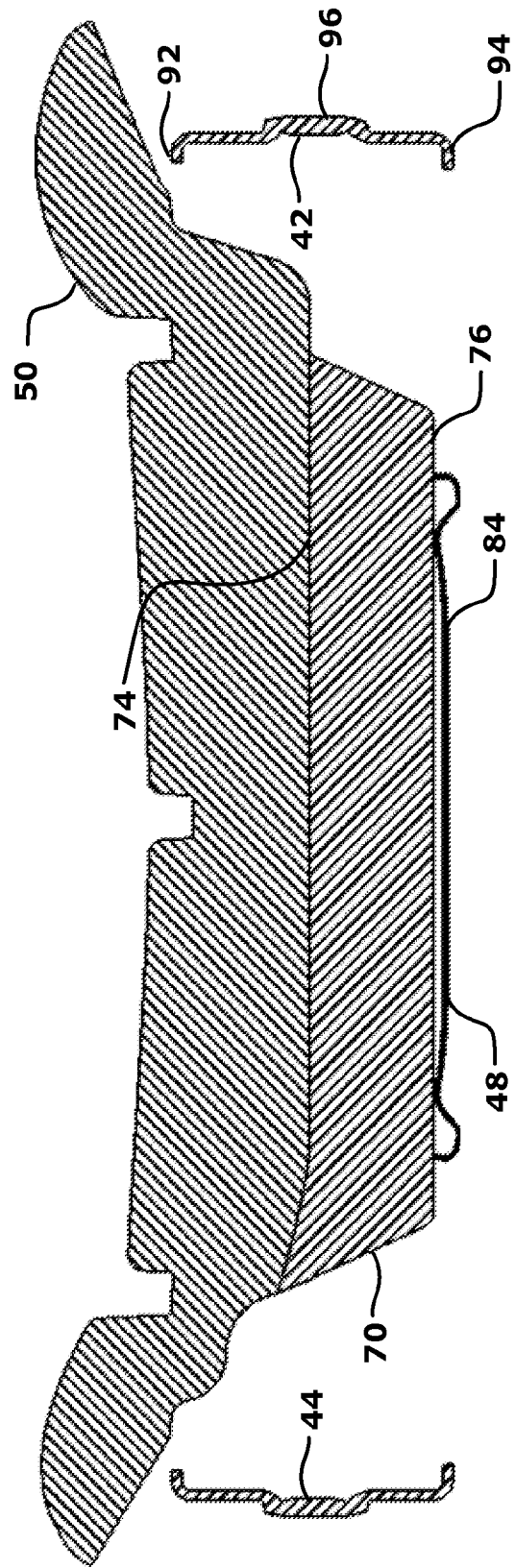
FIG. 7 is a sectional top view of FIG. 6 along line B-B.

FIG. 7 is a sectional top view of FIG. 6 along line B-B. As illustrated in FIG. 7, the first and second side members 42, 44 of the frame 40 each have a front surface 92 and a rear surface 94 connected by at least one side surface 96. The rear surface 84 of the cross-member 48 is generally co-planar with the rear surfaces 94 of the first and second side members 42, 44. The impact absorption block 70 can have a depth not exceeding the span from the front surfaces 92 to the rear surfaces 94 of the first and second side members 42, 44.

The impact absorption block 70 for use in the vehicle seatback assembly as described above can comprise a front surface 74 positioned spaced apart from a seat occupant by the seat pad 50, as shown in FIG. 7. The rear surface 76 of the impact absorption block 70 can be positioned to align vertically with the cross-member 48 of the frame 40. The vertical midpoint 86 of the front surface 74 can be positioned to align with the hip point 90, as shown in FIG. 6. The impact absorption block 70 can be positioned between the seat pad 50 and the cross-member 48 such that the impact absorption block 70 is in a non-compressed state during normal use of the vehicle seatback assembly and in a compressed state during a rear impact of the vehicle seatback assembly. Normal use of the vehicle is considered to be what those skilled in the art would consider normal use, for example, sitting in a non-moving vehicle and sitting in a moving vehicle at legal speeds.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle seatback assembly comprising:
   a seatback frame comprising:
      a first side member having an upper end and a lower end;
      a second side member spaced apart from and substantially parallel to the first side member and having an upper end and a lower end; and
      a cross-member extending between the first and second side members;
   a seat pad overlying the seatback frame to define a forward surface; and
   an impact absorption block positioned between the seat pad and the cross member and laterally between the first and second side members.

2. The vehicle seatback assembly of claim 1 wherein the impact absorption block is fixedly attached to the seat pad.

3. The vehicle seatback assembly of claim 2 wherein the impact absorption block is over-molded onto the seat pad.

4. The vehicle seatback assembly of claim 1 wherein the seat pad comprises a first material and the impact absorption block comprises a second material, and wherein the first material is less dense than the second material.

5. The vehicle seatback assembly of claim 1 wherein the cross-member comprises a base segment having two ends, a side segment extending at an angle from each end and a flange extending from each side segment opposite the base segment.

6. The vehicle seatback assembly of claim 1 wherein the cross-member extends between the first and second side members in a generally V-shape.

7. The vehicle seatback assembly of claim 1 wherein the cross-member connects to the lower ends of the first and second side members.

8. The vehicle seatback assembly of claim 1 wherein the first and second side members each have a front surface and a rear surface connected by at least one side surface, and wherein a rear surface of the cross-member is generally coplanar with the rear surfaces of the first and second side members.

9. The vehicle seatback assembly of claim 1 wherein the impact absorption block is spaced apart from a bottom portion of the seat pad.

10. The vehicle seatback assembly of claim 1 further comprising a pivot axis around which the seatback rotates, the pivot axis positioned below the impact absorption block.

11. The vehicle seatback assembly of claim 1 wherein the impact absorption block substantially spans a lateral width between the first and second side members.

12. The vehicle seatback assembly of claim 1 wherein the first and second side members each have a front surface and a rear surface connected by at least one side surface, and wherein the impact absorption block has a depth not exceeding the span from the front surfaces to the rear surfaces of the first and second side members.

13. A vehicle seatback assembly comprising:
   a seatback frame comprising:
      a first side member having an upper end and a lower end;
      a second side member spaced apart from and substantially parallel to the first side member and having an upper end and a lower end; and
      a cross-member extending between the first and second side members;
   a seat pad overlying the seatback frame to define a forward surface;
   an impact absorption block positioned between the seat pad and the cross member,
   wherein the impact absorption block is positioned closer to the lower end of the first and second side members than the upper end of the first and second side members such that a vertical midpoint of the impact absorption block is configured to be generally aligned in the seatback with a hip point of an average sized adult seat occupant.

14. The vehicle seatback assembly of claim 1 further comprising a torque rod that connects to the first and second side members and that extends laterally between the first and second side members, wherein the impact absorption block is positioned above the torque rod.

15. The vehicle seatback assembly of claim 14 wherein the seat pad includes a bottom portion extending rearward from a bottom end of the seat pad below the torque rod and beyond a rear surface of the cross-member.

16. The vehicle seatback assembly of claim 1 wherein the impact absorption block comprises polyurethane foam.

17. An impact absorption block for use in a vehicle seatback assembly that includes a frame with a cross-member and a seat pad supported by the frame, the impact absorption block comprising:
   a front surface positioned spaced apart from a seat occupant by the seat pad, wherein the impact absorption block is positioned within a boundary defined by the frame and closer to a lower end of the frame than an upper end of the frame such that a vertical midpoint of the front surface is configured to be positioned to generally align with a hip point of an average sized adult seat occupant; and
   a rear surface positioned to align vertically with the cross-member of the frame.

18. The vehicle seatback assembly of claim 17, wherein the impact absorption block has a substantially trapezoidal cross-section when said cross-section is taken from at least one of a vehicular width direction, a vehicular height direction, or a vehicular forward direction.

19. The impact absorption block of claim 17, wherein the impact absorption block is positioned between the seat pad and the cross-member such that it is in a non-compressed state during normal use of the vehicle seatback assembly and in a compressed state during a rear impact of the vehicle seatback assembly.

20. The vehicle seatback assembly of claim 1, wherein the impact absorption block has a substantially trapezoidal cross-section when said cross-section is taken from at least one of a vehicular width direction, a vehicular height direction, or a vehicular forward direction.

* * * * *